Feb. 11, 1936. F. G. BEETEM Re. 19,848

EMERGENCY LIGHTING SYSTEM

Original Filed April 20, 1931

INVENTOR

Frank G. Beetem

BY

Augustus B. Stoughton

ATTORNEY.

WITNESS:

Robt R. Kitchel.

Reissued Feb. 11, 1936 Re. 19,848

UNITED STATES PATENT OFFICE 19,848

EMERGENCY LIGHTING SYSTEM

Frank G. Beetem, Philadelphia, Pa., assignor to The Electric Storage Battery Company, Philadelphia, Pa., a corporation of New Jersey Original No. 1,882,472, dated October 11, 1932, Serial No. 531,502, April 20, 1931. Application for reissue July 31, 1934, Serial No. 737,860

4 Claims. (Cl. 171—97)

My invention provides an emergency lighting circuit normally supplied from the usual source of current and a transfer switch to connect this circuit to a storage battery when the normal source of supply fails. Apparatus is provided for charging the battery from the normal source at either a high rate or a low rate, and a relay responsive to the voltage of the battery is provided to reduce the charging rate when the battery voltage reaches a certain value. Whenever the voltage of the normal source drops below a certain point, thus throwing the emergency lighting circuit across the battery and causing an appreciable discharge from the latter, the voltage relay is reset to provide for the high rate of charge as soon as the normal voltage of the supply circuit is restored.

Figure 1:
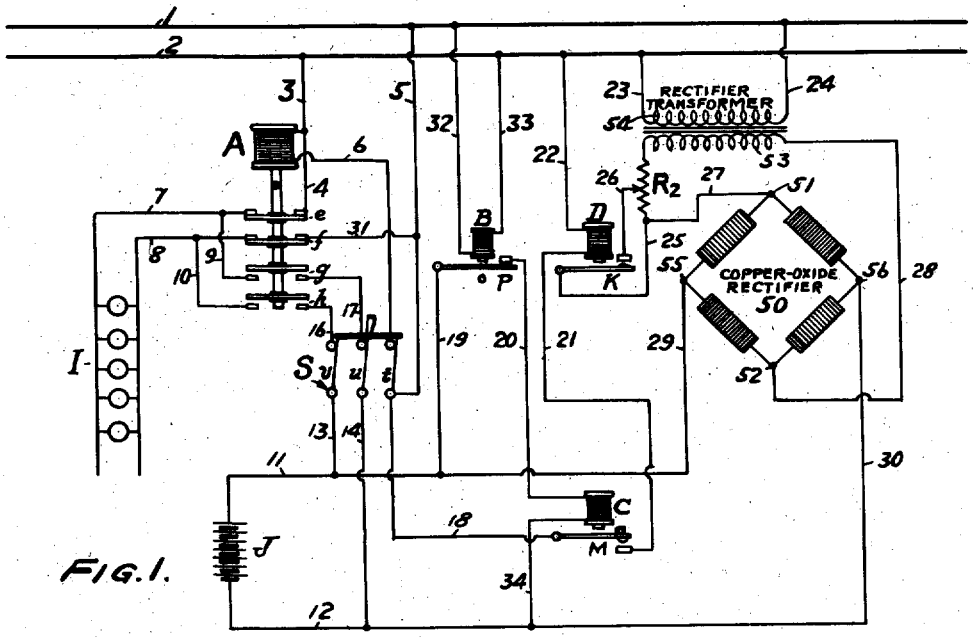
Figure 1 is a diagrammatic view showing one rectifier.
Figure 2:
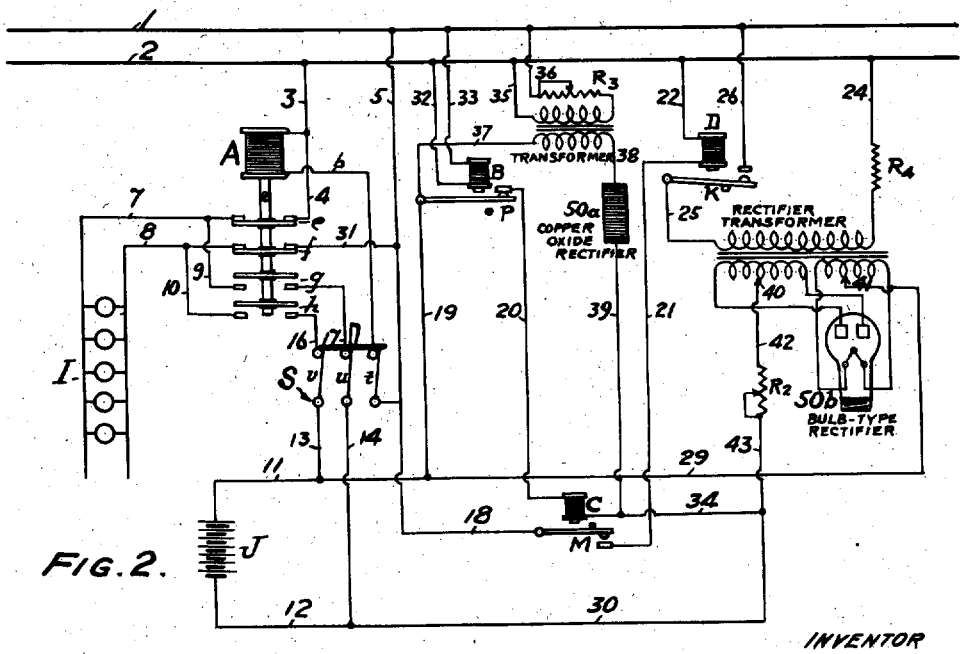
Figure 2 is a diagrammatic view in which two rectifiers are shown, one for the higher rate and the other for the low rate of charge.

Referring to Figure 1, 1 and 2 are the alternating current supply mains. When the 3-pole single throw switch S is closed, the current flows from the alternating current supply mains, from main 1 through conductor 5, through switch blade *t*, conductor 6 to solenoid A, returning to the other side of the supply circuit 2 through conductor 3. The excitation of solenoid A causes the plunger of the automatic transfer switch to lift its four contact strips, closing the circuits at *e* and *f* and opening the circuits at *g* and *h*. Emergency lights then obtain current from the normal supply mains 1 and 2. Current flows from conductor 1, through conductor 5, through conductor 31, across contact *f*, to conductor 8, through emergency lamps I to conductor 7, then through contacts *e*, returning through conductors 4 and 3 to conductor 2, the opposite side of the line.

If a failure of the normal alternating current supply occurs while switch S is closed, the excitation of solenoid A ceases and the plunger drops by gravity, so that the circuit through contacts *e* and *f* is opened and then completed through *g* and *h*. Emergency lights are then supplied by current derived from the storage battery J. Current flows from the battery through conductors 11 and 13, blade *v* of switch S, through conductor 16, through contacts *h* to conductor 10, thence to 8 and lamps I, returning to the battery by way of conductors 7 and 9, contact *g*, 17, blade *u*, 14 to 12, the opposite polarity of the battery. When the A. C. supply is restored, the plunger of the automatic transfer switch A is pulled up again, the battery being disconnected from the emergency lamps and reconnected to the alternating current supply.

The battery J is charged by means of the copper-oxide rectifier 50, arranged in the well known manner as a Wheatstone bridge. The two diagonally opposite junction points 51 and 52 are connected by conductors 27 and 28 across the terminals of the secondary winding 53 of a transformer whose primary winding 54 is connected by conductors 23 and 24 to the A. C. supply circuit 1, 2. The other two opposite junction points of the bridge 55 and 56 are connected by conductors 29, 11 and 30, 12, to the corresponding terminals of the battery. A resistance $R_2$ is connected in series between conductor 27 and the transformer secondary for controlling the output of the transformer.

An adjustable section of this resistance is arranged to be short-circuited by the contacts K of a switch controlled by magnet D, so that when this magnet is excited, the contacts K are closed, short circuiting a portion of resistance R, and increasing the output of rectifier 50 to its higher value. Current for exciting magnet D is derived from the circuit 1, 2 via conductor 22, solenoid D, conductor 21, contacts of switch M, and conductors 18 and 5. Switch M is controlled by solenoid C, which is connected across the battery by conductors 34, 20, contacts of switch P, and conductor 19. When the voltage of the battery is below a certain value, the contacts M remain closed, thus maintaining the excitation of solenoid D and keeping contacts K closed, thus maintaining the output of the rectifier at its maximum value. When the battery voltage rises toward the end of charge to a certain value, solenoid C will open the contacts at M, thus interrupting the excitation of solenoid D, opening the contacts K and reducing the output of rectifier 50 to its lower value.

When the alternating current supply fails, coil B, being connected to mains 1 and 2 by conductors 32 and 33, loses its excitation and contacts P are opened, thus opening the circuit of solenoid C, which will allow the contacts M to close. When the normal alternating current supply is reestablished, the voltage across battery mains 11 and 12 is insufficient to cause contacts M to open even with contacts P closed. Consequently contacts M remain closed and the excitation of coil D causes contacts K to close, short circuiting a part of resistance $R_2$, increasing the charge rate to the battery to the higher value.

In Figure 2, two rectifiers are shown, a small one, of the copper-oxide type, 50*a*, for supplying the low rate of charge and a bulb type rectifier 50*b*, of greater capacity, whose output is added to that of the smaller one to furnish the higher rate of charge.

For the rectifier 50*a* is shown a transformer having its primary winding connected across the supply circuit conductors 1 and 2 by means of conductors 35 and 36, a resistance $R_3$ being interposed in this circuit for the purpose of controlling the output of the rectifier. The secondary circuit is connected to the battery through the rectifier 50*a* by means of conductors 37, 19 and 11 to one side of the battery J, thence through the battery, returning by way of conductors 12, 30, 34 and 39. This rectifier operates at all times when the alternating current supply is available. After an emergency discharge, the rapid recharge is accomplished by means of a second rectifier 50*b* of larger capacity, which has been shown for convenience as a bulb type rectifier. Whenever contacts M of the voltage responsive relay C are closed, coil D is excited just as in the arrangement of Figure 1. The excitation applied to this coil results in closing contacts K, and the rectifier transformer primary then derives excitation from the alternating current supply mains 1 and 2 by way of conductor 26, contacts K, conductor 25, resistance R, and conductor 24. The secondary circuit of the rectifier 50*b* is such that direct current from point 40, which is a tap on the transformer secondary winding, flows through conductor 42, through adjustable resistance $R_2$, conductors 43, 30 and 12 to battery J, thence through the battery to conductors 11 and 29 to point 41, which is the point of opposite polarity of the rectifier secondary circuit.

A novel feature of this invention lies in the arrangement for resetting the voltage relay C to provide the higher charging rate after an emergency discharge, this resetting being accomplished by the reduction of voltage on the normal supply circuit which causes the transfer of the emergency lighting circuit to the battery.

Where the word failure is used in the above description as applied to the normal supply circuit, it is intended to cover any abnormal drop in voltage as well as a complete interruption. It is to be noted also that the adjustment of the apparatus should preferably be such that the armature of the relay B will drop before the plunger of the transfer switch A drops. Otherwise it would be possible for the voltage on the circuit 1, 2 to drop just enough to allow the plunger of the transfer switch A to fall and throw the emergency lighting circuit across the battery without resetting the voltage responsive relay C for the higher charging rate which is desirable after every emergency discharge.

I do not intend to be limited in the practice of my invention save as the scope of the prior art and of the attached claims may require.

I claim:—

1. In an emergency lighting system, in combination a load circuit, a normal source of current, a storage battery, means responsive to the voltage of the normal source for selectively connecting the load circuit either to the said source or to the battery, means for charging the battery selectively at either a higher or a lower rate, means responsive to the voltage of the battery for reducing the charging rate from the higher to the lower, and means responsive to the voltage of the normal source for resetting the battery voltage responsive means for the higher rate.

2. In an emergency lighting system, in combination an alternating current circuit which serves as the customary source of supply, a storage battery, an automatic switch responsive to the voltage of the said alternating current circuit for connecting said alternating current circuit to said load when there is a predetermined voltage in said alternating current circuit and for connecting said load to said battery on failure of such voltage, a rectifier transformer connected to said alternating current circuit, a rectifier connected to said transformer and to said storage battery, means controlling the amount of current output from said rectifier, a switch responsive to the voltage of said storage battery controlling said means to reduce the output of said rectifier when the voltage of said battery has risen to a predetermined amount, and an automatic switch responsive to the voltage of said alternating current circuit controlling said battery voltage responsive switch to open said battery voltage responsive switch to increase the succeeding output of said rectifier after a predetermined decrease of voltage in said alternating current circuit.

3. In an emergency electrical consumption system, in combination, a load circuit, a normal source of current, a storage battery, means responsive to the voltage of the normal source for selectively connecting the load circuit either to the said source or to the battery, means for charging the battery selectively at either a higher or a lower rate, means responsive to the voltage of the battery for reducing the charging rate from the higher to the lower, and voltage responsive means for resetting the battery voltage responsive means for the higher rate.

4. In an emergency electrical consumption system, in combination, a load circuit, a normal source of current for said circuit, a storage battery adapted to supply current to the load circuit in case of failure of the normal source, means for charging the battery selectively at either a higher or a lower rate, means responsive to the voltage of the battery for reducing the charging rate from the higher to the lower, and voltage responsive means for resetting the battery voltage responsive means for the higher rate.

FRANK G. BEETEM.